Sept. 3, 1935. F. J. POEPPEL 2,013,504
MEAT TENDERER
Filed April 9, 1934 2 Sheets-Sheet 2
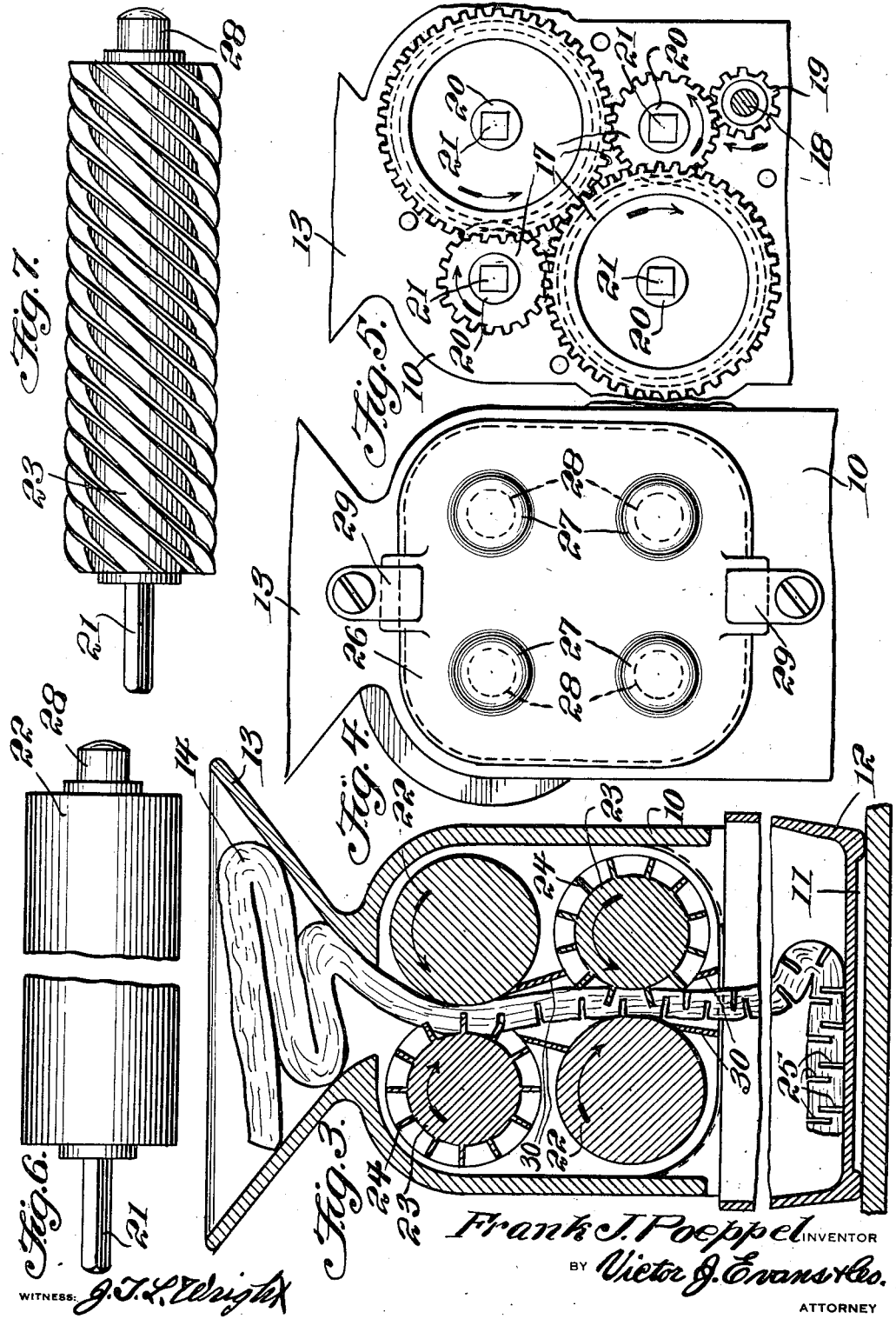
Frank J. Poeppel INVENTOR
BY Victor J. Evans & Co.
ATTORNEY
WITNESS:

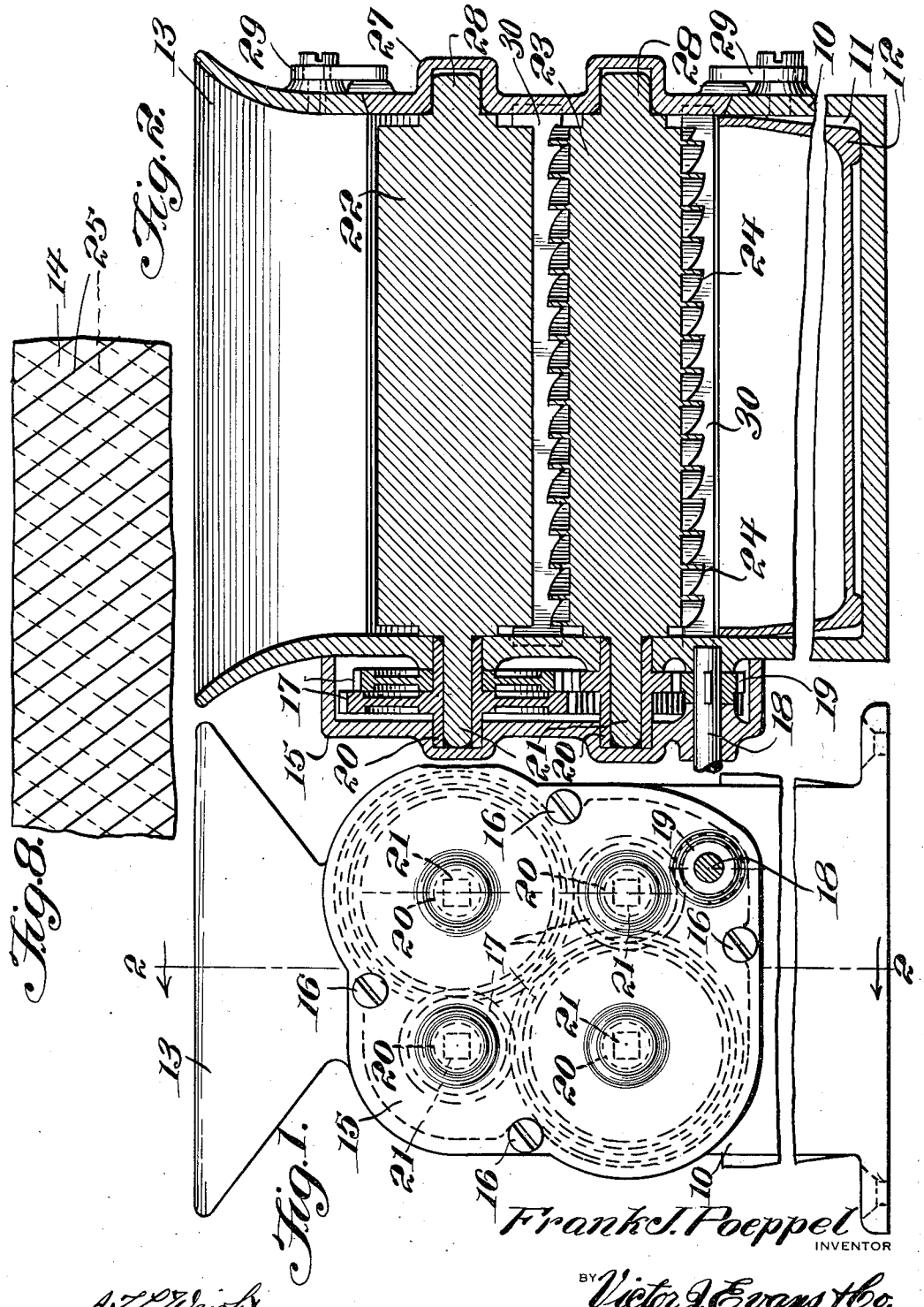

Patented Sept. 3, 1935

2,013,504

UNITED STATES PATENT OFFICE 2,013,504

MEAT TENDERER

Frank J. Poeppel, Chicago, Ill.

Application April 9, 1934, Serial No. 719,739

1 Claim. (Cl. 17—26)

The invention relates to a meat tenderer and more especially to steak cutters.

The primary object of the invention is the provision of a machine of this character, wherein a slice of meat, such for example as steak, is dropped or thrown into the same, so as to be automatically cut, straightened and drawn between cutters, one being located at one side and the other at the other side of the piece of meat so as to sever the fibers without mashing such meat and to discharge the same into a receiving tray in a flat condition.

Another object of the invention is the provision of a machine of this character, wherein a slice of meat is operated upon by spiral cutters, these coacting in conjunction with solid rollers, thus producing effective cutting action, the spirals of the cutters being in opposite directions with respect to each other, so that the fibers of the meat will be cut clean on both sides thereof sufficiently deep to assure the holding together of the meat and retaining all juices, with the result of an increased cooking surface exposure and thus enhancing richness of flavor, as well as rendering the slice of meat tender.

A further object of the invention is the provision of a machine of this character which is simple in construction, operated either by motive power or hand, speedy in action, thoroughly reliable and efficient in its purpose and inexpensive to manufacture.

With these and other objects in view, the invention consists in the features of construction, combination and arrangement of parts as will be hereinafter more fully described in detail, illustrated in the accompanying drawings, which disclose the preferred embodiment of the invention, and pointed out in the claim hereunto appended.

In the accompanying drawings.

Figure 1 is an end elevation of the machine constructed in accordance with the invention, the power shaft being shown in section.

Figure 2 is a sectional view on the line 2—2 of Figure 1 looking in the direction of the arrows.

Figure 3 is a vertical transverse sectional view through the machine showing a slice of meat operated upon by the machine.

Figure 4 is a fragmentary elevation similar to Figure 1 looking toward the opposite end of the machine.

Figure 5 is a detail elevation showing the driven gear train.

Figure 6 is a side elevation of one of the rollers of the machine.

Figure 7 is a side elevation of one of the cutters of the machine.

Figure 8 is a fragmentary plan view of a slice of meat showing the cut formation therein.

Similar reference characters indicate corresponding parts throughout the several views in the drawings.

Referring to the drawings in detail, the machine comprises a body 10 in the form of a casing which is adapted to be placed at rest and secured to any suitable support, the lower base portion of the body being formed with a guideway 11 for a removable or slidable receiving tray 12, while the upper portion of said body constitutes a feed hopper or mouth 13 for the introduction of a slice of meat 14, such as a steak, to be operated upon for the tendering thereof.

Arranged at one end of the body 10 is a removable gear housing 15, the same being removably secured to suitable fasteners 16, and within this housing is a driven gear train 17 operated from a power shaft 18, either hand or motor actuated, the shaft being fitted with a pinion 19 meshing with one of the gears of the train 17. The other gears of the train 17 are formed with square socketed hubs 20 for the removable fitting of the squared end journals 21 of pairs of rollers 22 and cutters 23, respectively, these being reversed and superposed within the body for action on the steak 14 at opposite sides thereof.

A pair of cutters 23 are identically formed and each present several helical cutting blades 24. These cutters 23 are oppositely arranged within the assembly of the machine, with the result that the lines of severance made by one cutter are diagonally arranged with respect to the lines of severance made by the other cutter and the blades 24 penetrate the meat 14 at a depth sufficient to have the latter hold together and retain all juices, with a resultant increased cooking surface exposure, the lines of cut in the meat 14 being indicated at 25.

At the other end of the body 10 is a removable section 26, this having the bearings 27 for accommodating the round journal ends 28 of the rollers 22 and cutters 23, respectively.

The removable section 27 is retained in place by swinging latches 29 and when removed will permit of the taking of the rollers 22 and cutters 23 from the body 10 of the machine, the purpose being to permit the thorough cleaning of said rollers and cutters to assure a sanitary condition.

Within the body 10 of the machine are suitable guides 30 for directing the course of the slice of steak 14 between the rollers 22 and cutters 23 in the operation of the machine.

It should be obvious that the slice of meat placed within the hopper or mouth 13 of the machine will take a perpendicular path or movement and by gravity moves between the uppermost roller 22 and cutter 23 and thence passes directly therefrom to the lower roller 22 and cutter 23 without tendency to roll.

The significance of the helical cutting blades 24 resides in the fact that the angularity of the blades performs a feeding function in addition to its cutting action and a clean cut is made. The upper blade in the machine tends to move the slice of meat laterally a small degree, while the lowermost blade shifts the slice laterally to approximately the same degree in the opposite direction.

In the operation of the machine a slice of meat is dropped or thrown into the hopper 13 and by force of gravity one end of the slice will be clutched between the uppermost roller 22 and cutter 23 and the said cutter will spirally cut the face of the slice of meat for the severance of its fibers on that side, while the roller straightens and draws the slice of meat, directing it to the lower roll 22 and cutter 23, whence the said lower cutter will spirally cut the other face or side of the meat and these severances will be diagonally of the meat and reversed at opposite sides thereof and the said cut piece of meat will be deposited flat in the tray 12. This machine positively does not mash the meat but cuts all fibers cleanly on both sides just deep enough to permit the meat to hold together nicely, retaining all juices and increasing the cooking surface exposure, with a resultant enhanced richness of flavor and tenderized.

What is claimed is:

A machine of the character described comprising a body, pairs of reversely arranged superposed cutters and rollers within the body, reverse spiral cutting formations on said cutters, a gear train operating said rollers and cutters, a removable housing enclosing the gear train, a removable section in the body for releasably journaling said rollers and cutters, and a feed hopper formed at the upper end of the body.

FRANK J. POEPPEL.